J. J. HALLORAN.
RESILIENT WHEEL.
APPLICATION FILED MAY 10, 1915.

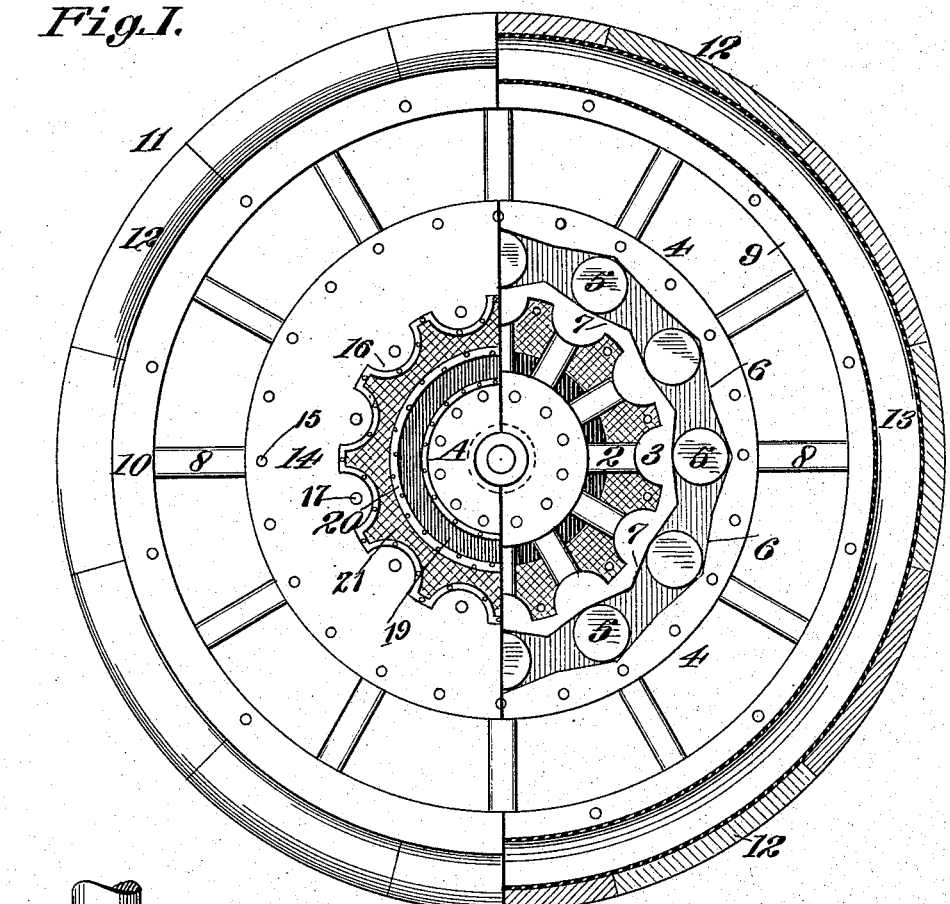

1,170,897.

Patented Feb. 8, 1916.
2 SHEETS—SHEET 2.

WITNESSES:
Charles Rokles
Thos Castberg

INVENTOR
John J. Halloran
BY G. H. Strung
ATTORNEY

THE COLUMBIA PLANOGRAPH CO., WASHINGTON, D. C.

UNITED STATES PATENT OFFICE.

JOHN J. HALLORAN, OF DALY CITY, CALIFORNIA.

RESILIENT WHEEL.

1,170,897.  Specification of Letters Patent.  Patented Feb. 8, 1916.

Application filed May 10, 1915. Serial No. 27,067.

*To all whom it may concern:*

Be it known that I, JOHN J. HALLORAN, a citizen of the United States, residing at Daly City, in the county of San Mateo and State of California, have invented new and useful Improvements in Resilient Wheels, of which the following is a specification.

This invention relates to a resilient wheel.

One of the objects of the present invention is to provide a resilient wheel of the pneumatic type, in which the pneumatic or resilient members are interposed between the hub and outer tread portion of the wheel.

Another object of the invention is to provide a simple, substantial construction together with a novel form of driving connection between the inner and outer sections of the wheel.

Further objects will hereinafter appear.

The invention consists of the parts and the construction and combination of parts hereinafter more fully described and claimed, having reference to the accompanying drawings, in which—

Figure 4:
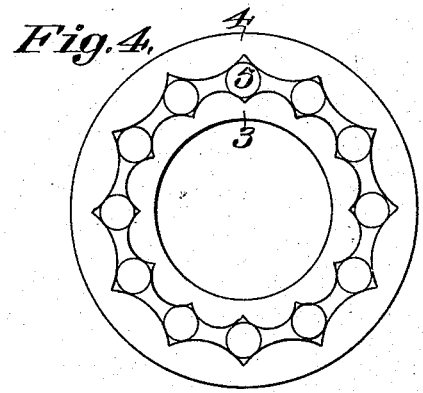
Figure 5:
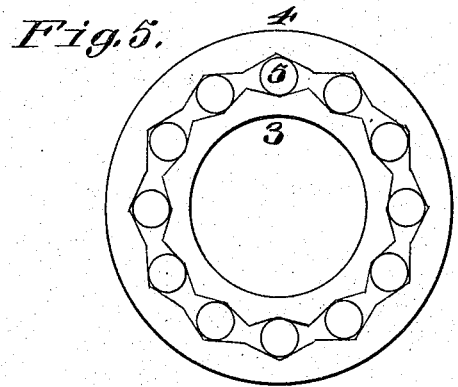
Figure 6:
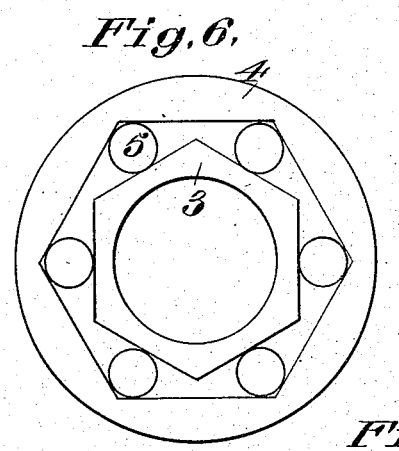
Figure 7:
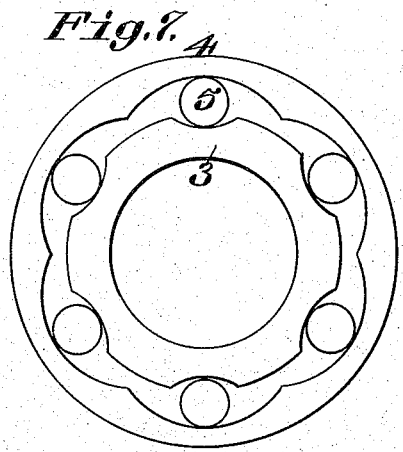
Figure 3:
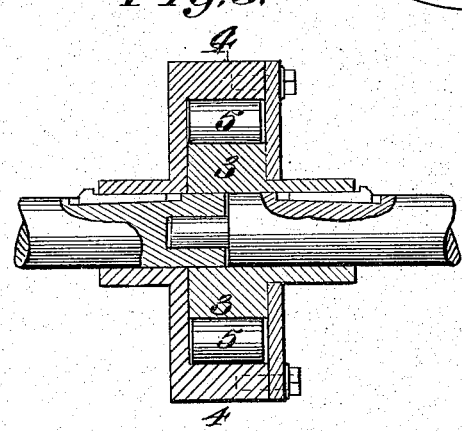

Figure 1 is a side elevation of the wheel, partly in section. Fig. 2 is an enlarged cross section of the wheel. Fig. 3 is a modification of the device, showing it applied as a flexible coupling for line shafts. Figs. 4, 5, 6 and 7 show various modifications of the faces formed between the inner and outer rims.

More particularly described, A indicates the hub of the wheel constructed of steel or any other suitable material. The hub may be fixed in any approved manner on a shaft, or on the other hand arranged to turn on an axle spindle and may be equipped with a standard or other anti-friction bearings. Concentrically secured to the hub by means of spokes 2, is an inner rim section 3. Mounted concentrically and exterior of the same in space relation therewith is an outer rim section 4, and interposed between said rim sections are a plurality of cushion members 5. These cushion members consist of solid rubber, or like resilient material, or may be inflated if desired, and are in some instances spherical in shape and in other instances of roller form. Formed on the inner face of the outer rim section 4 is a plurality of angularly disposed faces 6 and similarly formed on the outer face of the inner rim section is a plurality of angularly disposed faces 7. The opposite faces on the rim sections being disposed at an angle opposite to each other for purposes hereinafter to be described.

Suitably secured to the outer rim section 4 or as here shown by means of spokes 8 is a felly 9 and secured to said felly by means of clencher rims 10 is a tire or tread section 11, of any suitable construction. In the present instance, the tire 11 is shown as constructed of a plurality of sections 12, which are secured by means of the clencher rims 10 and interior of which is mounted a filler consisting of a metal tube 13, the object of the metal tube 13 being to decrease the weight of the wheel and the quantity of rubber which would otherwise be required.

For the purpose of securing the outer wheel section comprising the tire, felly and outer rim 4 with relation to the inner wheel section comprising the hub A and inner rim 3 and particularly for the purpose of supporting said sections against lateral movement with relation to each other, a pair of cover plates 14 have been provided, which plates are fixed to the outer rim section by means of bolts 15 and are sufficiently wide to cover the inner rim section 3. The inner edge of each plate is provided with a plurality of inwardly extending tongues or lugs 16 which are so arranged as to assume a position intermediate of spokes 2. A brace bolt 17 passing through each set of lugs secures the inner edges of the plates together. For the purpose of preventing the brace or tie-bolts 16 from drawing the inner edges of the plates together to such an extent as to clamp or hinder the free movement of the inner rim section with relation to the outer rim sections, a spacing sleeve (not shown) may be provided for each bolt, thus permitting the inner edges of the plates to be securely fastened with relation to each other and at the same time preventing clamping action as far as the inner rim section 3 is concerned. Plates 14 in this manner not only furnish a support or brace which locks the inner and outer wheel sections against lateral movement with relation to each other, but also serve as a housing for the cushion members 5.

For the purpose of preventing dust, water or other objectionable material from entering the space occupied by the cushion members, a dust guard generally indicated at 19 has been provided. This dust guard consists of a steel ring 20, between which and the hub a flexible section of rubber or like material is interposed, and a second section 21 preferably constructed of flexible fabric or other like material, said section being secured on one side to the ring and on the other to the plate to which it is connected. A flexible connection is thus formed between the hub and plates 14 which permits perfect freedom of movement of the inner wheel with relation to the outer, and at the same time positively prevents admission of dust, water or other objectionable matter. The provision of the cushion members here employed together with the angularly positioned faces formed on the inner and outer rim sections does not only prevent transmission of the shocks of travel and their diffusion through the entire wheel, but also permits a slight turning movement of one wheel section with relation to the other, the inclined faces on the different rims permitting this movement. This is of great importance, as it eliminates unnecessary strain on engine and transmission when throwing on the power in starting or backing up.

In Fig. 3 a different application of the invention is shown, in this instance the device as a whole is employed as a flexible coupling, said coupling being interposed between two sections of a line shaft, the advantage of such provision when considering general life and efficiency being generally recognized.

The device as a whole constructed as here shown, is simple, and substantial in construction. The wheel may at any time be quickly and readily assembled and different proportions such as bearings and supporting faces may easily be changed as the application or circumstance of its use may require.

While the wheel here shown is particularly applicable to automobiles and like vehicles, I wish it understood that it may be used for railway cars and like rolling stock, as it will practically eliminate transmission or vibration both to the ties on which the tracks are supported, and to the car proper, thus permitting the use of concrete or metal ties.

The materials and finish of the several parts of the apparatus are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent, is:

1. In a wheel, a hub, an inner rim section encircling the hub, spokes supporting the rim section from the hub, an outer rim section encircling the inner rim section, yieldable means spacing the outer rim section from the inner rim section, side plates fixed to the outer section and extending inwardly over the inner section to prevent relative lateral movement between the rim sections, and a composite guard for preventing admission of dust between the inner rim section and side plates comprising fabric elements secured to the inner edges of the side plates and connections of resilient material between the fabric pieces and the hub.

2. In a device of the character described inner and outer concentrically positioned rim members, angularly disposed straight faces formed on the inner side of the outer rim member, oppositely disposed angular straight faces formed on the outer side of the inner rim member, and a plurality of resilient members interposed between the angular faces of the rim members, each resilient member normally seating at the junction of a pair of faces of each rim member.

3. A device of the character described comprising a hub having a rim section secured concentric therewith, and exterior thereof, said rim section having a plurality of V shaped recesses formed in its face, a second rim section concentric with and exterior of the first-named rim, said exterior rim having a plurality of V shaped recesses formed on its inner face in alinement with the opposite recesses, a plurality of resilient members interposed between the rim sections, one for each set of alined V shaped recesses, and a tire secured to the exterior rim section.

In testimony whereof I have hereunto set my hand in the presence of two subscribing witnesses.

JOHN J. HALLORAN.

Witnesses:
 DOMINIC PANELLA,
 HENRY TOFT.

Copies of this patent may be obtained for five cents each, by addressing the "Commissioner of Patents, Washington, D. C."